US008382589B2

(12) United States Patent
Koo

(10) Patent No.: US 8,382,589 B2
(45) Date of Patent: Feb. 26, 2013

(54) MUSICAL ACTION RESPONSE SYSTEM

(75) Inventor: Chang Hoh Koo, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 223 days.

(21) Appl. No.: 12/883,863

(22) Filed: Sep. 16, 2010

(65) Prior Publication Data

US 2012/0071240 A1 Mar. 22, 2012

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl. ............................................ 463/35; 463/31

(58) Field of Classification Search ..................... 463/35
See application file for complete search history.

(56) References Cited

U.S. PATENT DOCUMENTS

| | | | | |
|---|---|---|---|---|
| 2001/0007824 | A1 * | 7/2001 | Fukuda | 463/7 |
| 2003/0073489 | A1 * | 4/2003 | Hecht et al. | 463/35 |
| 2003/0216179 | A1 * | 11/2003 | Suzuki et al. | 463/35 |
| 2008/0250315 | A1 | 10/2008 | Eronen et al. | |
| 2009/0037822 | A1 | 2/2009 | Kandekar et al. | |
| 2009/0055426 | A1 | 2/2009 | Kalasapur et al. | |
| 2010/0018382 | A1 | 1/2010 | Feeney et al. | |

* cited by examiner

*Primary Examiner* — Michael Cuff
*Assistant Examiner* — Kevin Y Kim
(74) *Attorney, Agent, or Firm* — Patterson & Sheridan, LLP

(57) ABSTRACT

A framework is disclosed for associating visual elements of a computer game with musical scores of a computer game. In one embodiment, a visual element is moved in a virtual environment of the computer game, in response to user input. Playback of a musical score may be altered based on movement of the visual element. A visual effect in the scene may also be generated, based on the altered playback of the musical score.

21 Claims, 9 Drawing Sheets

ANIMATION: STANDING

SOUNDTRACK
PLAYBACK: NORMAL (LEAD INSTRUMENT: KEYBOARD)

ANIMATION: WALKING

SOUNDTRACK
PLAYBACK: FASTER TEMPO
(e.g.; $T_1$ X NORMAL TEMPO)/
HEAVIER PERCUSSION/
LEAD INSTRUMENT:
ACOUSTIC GUITAR

ANIMATION: RUNNING

SOUNDTRACK
PLAYBACK: EVEN
FASTER TEMPO
(e.g.; $T_2$ X NORMAL TEMPO)/
EVEN HEAVIER PERCUSSION/
LEAD INSTRUMENT:
ELECTRIC GUITAR

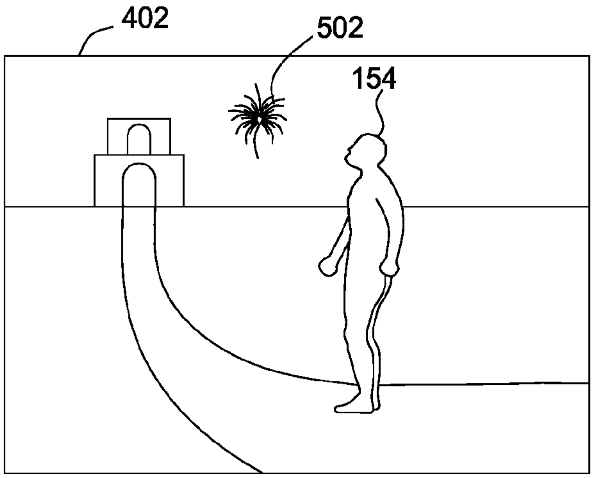

ANIMATION: STANDING

SOUNDTRACK
PLAYBACK: NORMAL

ENVIRONMENTAL
EFFECT: FIREWORKS

FIG. 5A

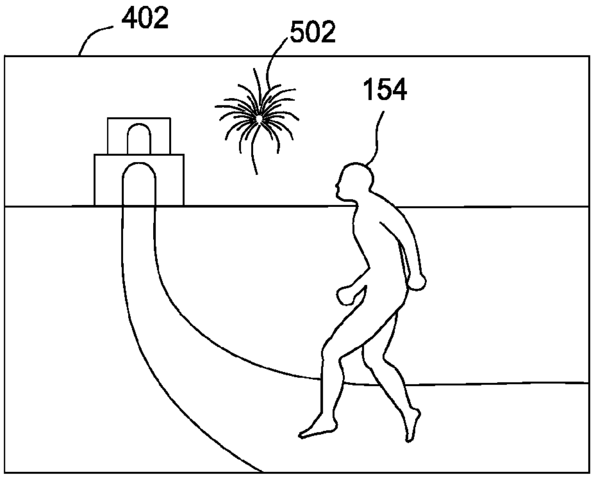

ANIMATION: WALKING

SOUNDTRACK
PLAYBACK: TRANSPOSE
UPWARDS BY ONE SEMITONE

ENVIRONMENTAL
EFFECT: INCREASE DIAMETER
OF FIREWORK PATTERNS

FIG. 5B

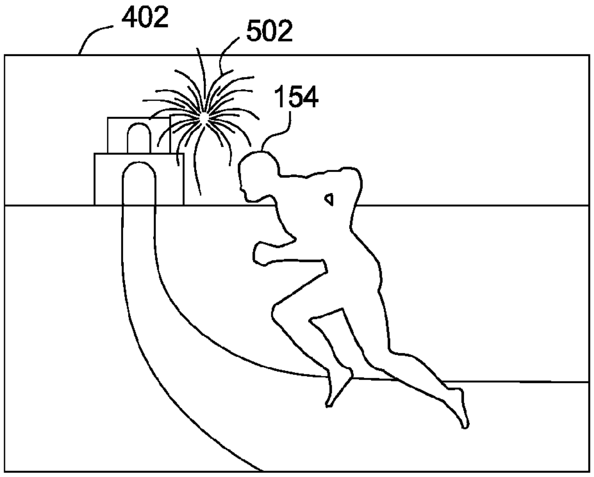

ANIMATION: RUNNING

SOUNDTRACK
PLAYBACK: TRANSPOSE
DOWNWARDS BY ONE SEMITONE

ENVIRONMENTAL
EFFECT: FURTHER
INCREASE DIAMETER
OF FIREWORK PATTERNS

FIG. 5C

ANIMATION: STANDING

SOUNDTRACK
  PLAYBACK: NORMAL

ENVIRONMENTAL
  EFFECT: SNOWFALL

ANIMATION: WALKING

SOUNDTRACK
  PLAYBACK: ADD
    INSTRUMENT: MARACAS

ENVIRONMENTAL
  EFFECT: ADD
    SNOWFLAKES

ANIMATION: RUNNING

SOUNDTRACK
  PLAYBACK: ADD
    INSTRUMENT: BONGO
    DRUMS

ENVIRONMENTAL
  EFFECT: ADD HAIL

MUSICAL ACTION RESPONSE SYSTEM

BACKGROUND

1. Field

Embodiments of the invention relate generally to computer games and, more particularly, to a framework for associating visual elements with musical scores in computer games.

2. Description of the Related Art

In-home computer games and computer game systems have become mainstream consumer products. Such systems allow a user to play computer games at home on a standard television set or on a handheld device that the user may carry with the user. Typically, in-home computer game systems include a console that reads computer game code from a storage device (e.g., a CD-ROM disc or cartridge) and transmits video to a television screen for display. Computer game systems also typically include a controller device that allows the user playing the computer game to provide inputs to the computer game to manipulate the characters or other features of the game.

Generally, the designer of the computer game will create a computer-rendered world in which the computer game characters or other features may interact. For example, many computer games allow a player to maneuver an avatar (e.g., a sprite or character) through a computer-rendered world to accomplish a set of tasks. Other computer games allow the player to control a vehicle or airplane through a computer-rendered world. In two-dimensional computer games, characters may move in two dimensions (e.g., up and down on the screen or left and right), while in three-dimensional computer games, characters are typically allowed to move in three dimensions in the computer-rendered world.

SUMMARY

Embodiments of the invention provide a computer-implemented method, computer-readable storage medium, and system for performing an operation that includes playing back a musical score accompanying a virtual environment of a computer game. The operation also includes receiving user input to the computer game; moving a visual element in the virtual environment of the computer game, in response to the received user input; and altering playback of the musical score accompanying the virtual environment, based on the movement of the visual element and according to predefined choreography data associating the movement of the visual element with the playback of the musical score, wherein the altering is not pre-scripted.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 5A-5C illustrate additional exemplary GUI screens of the computer game, according to one embodiment of the invention.

DETAILED DESCRIPTION

Figure 1:
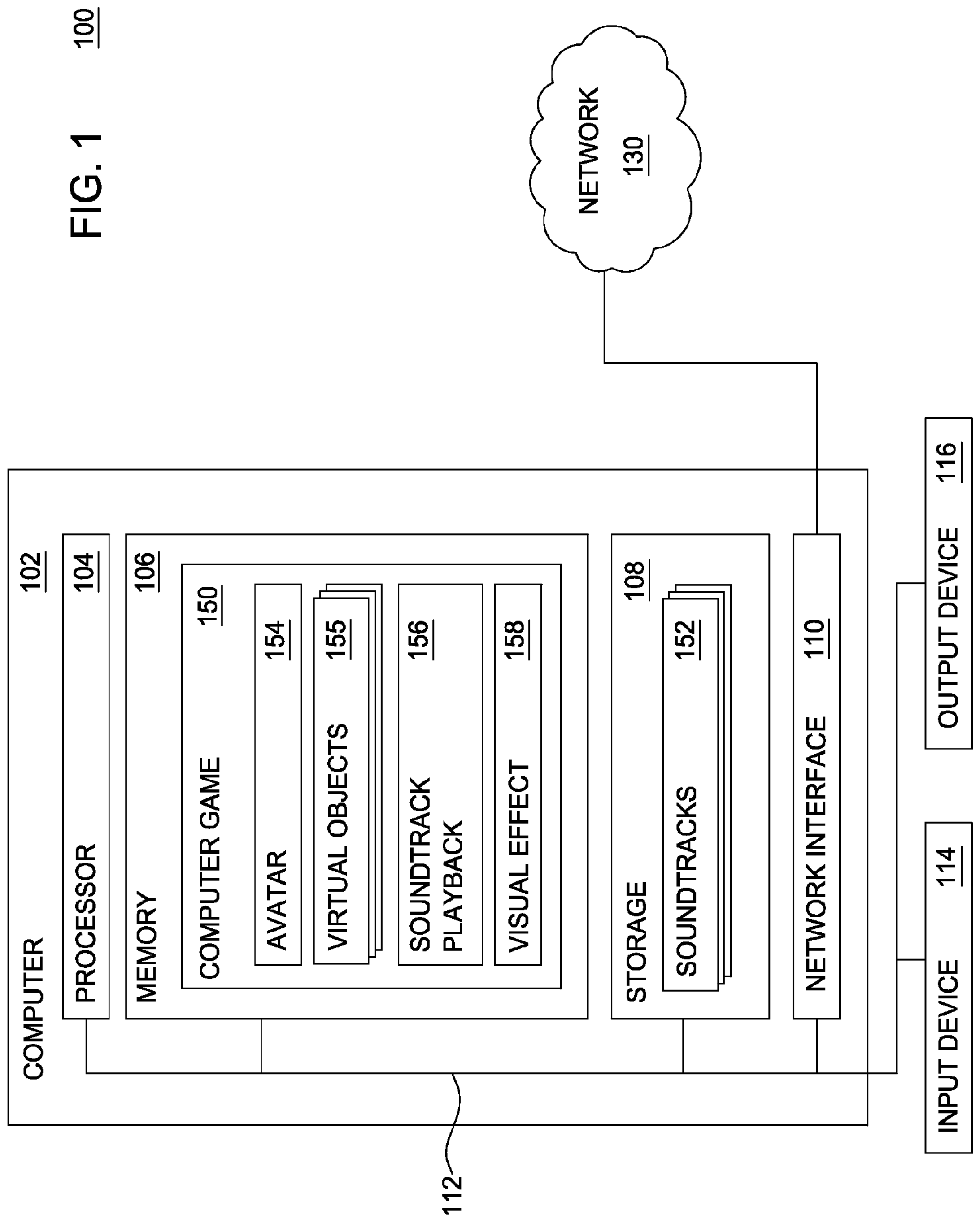
FIG. 1 is a block diagram illustrating a system for associating visual elements of a computer game with soundtracks of the computer game, according to one embodiment of the invention.

Embodiments of the invention generally provide a framework for associating visual elements in a virtual environment of a computer game with soundtracks of the computer game. The soundtracks may include musical scores (as opposed to sound effects of the computer game) that act as background music for the computer game. In one embodiment, a developer of the computer game uses the framework to specify how the visual elements in the virtual environment affect playback of the soundtracks (and/or vice versa). To this end, the developer may specify relationships between a set of animations of the visual elements and a set of soundtracks and/or playback effects. For instance, the developer specifies a normal playback of a soundtrack to accompany a standing animation of a user avatar in the virtual environment. The normal playback of a soundtrack refers to a default playback of the soundtrack without any playback effects. The developer may also specify a faster playback of the soundtrack to accompany a walking animation of the user avatar in the virtual environment. The framework synchronizes the playback of the soundtracks with the animation of the user avatar, such that when the user avatar transitions from a standing animation to a walking animation, the playback of the soundtrack speeds up.

Accordingly, associating the visual elements with the soundtracks of the computer game allows user-controlled activity in the virtual environment and playback of soundtracks to interact, thereby providing a more immersive user experience, which may improve user satisfaction with the computer game. For example, because actions of the user affect the soundtrack playback and/or visual elements in the virtual environment, each user playing the computer game may have a distinct gaming experience that is customized based on the actions of the respective user. Replay value of the computer game for each user is also improved, because replaying the computer game using different actions can lead to a different gaming experience. Further, associating the visual elements with the soundtracks of the computer game using the techniques described herein avoids a need for the development team of the computer game (e.g., developers, animators, soundtrack composers, and project managers) to manually synchronize soundtracks with animations involving the visual elements. Put another way, the development team no longer needs to pre-script soundtrack alterations that are based on animations. Advantageously, productivity of the development team may be improved and costs associated with developing the computer game may be reduced.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for associating visual elements of a computer game with soundtracks of the computer game, according to one embodiment of the invention. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system 152. Examples of operating systems 152 include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

It is specifically contemplated that embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a computer game) or related data available in the cloud. For example, the computer game described herein could execute on a computing system in the cloud, thereby allowing users to access the game from any computing system attached to a network connected to the cloud (e.g., the Internet).

As shown, the memory 106 of the computer 102 includes a computer game 150, and the storage 108 of the computer 102 includes soundtracks 152. In one embodiment, the computer game 150 provides a virtual environment that includes virtual objects 155, a user-controlled avatar 154, and a visual effect 158. The computer game 150 also provides soundtrack playback 156 (of the soundtracks 152). Depending on the embodiment, the computer game 150 may belong to one or more of the following genres: puzzle, action, adventure, arcade, role-playing, simulation, sports, racing, fighting, shooting, shooter, and strategy.

As described above, embodiments of the invention provide a framework for associating visual elements in a virtual environment of the computer game 150 with the soundtracks 152 of the computer game 150. In one embodiment, the framework is implemented in the form of a developer tool that is executed during development of the computer game 150, to create associations between assets (e.g., soundtracks and graphical objects) of the computer game 150. In another embodiment, the framework is implemented as a component of the computer game 150 and creates and/or enforces associations between the assets of the computer game 150 in real-time (i.e., as a user is playing the computer game 150). The framework for associating the visual elements and the soundtracks 152 is now further described with reference to FIGS. 2-10.

Figure 2:
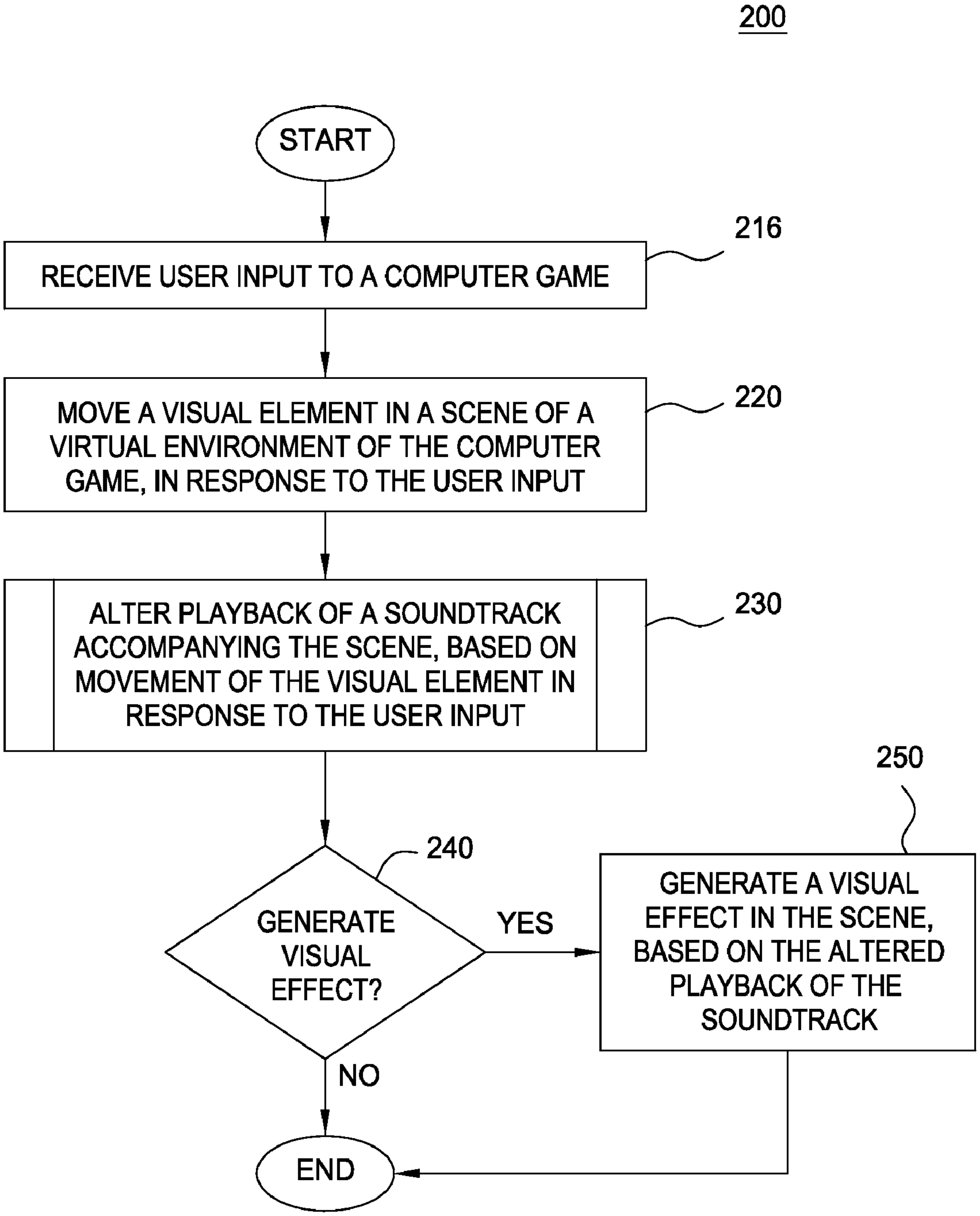
FIG. 2 is a flowchart depicting a method for associating a visual element of the computer game with a soundtrack of the computer game, according to one embodiment of the invention.

FIG. 2 is a flowchart depicting a method 200 for associating a visual element of the computer game with a soundtrack of the computer game, according to one embodiment of the invention. As shown, the method 200 begins at step 210, where the computer game 150 receives input from a user. For example, the user may provide the input to control an avatar 154 in the virtual environment of the computer game 150. The input may be provided via a keyboard, a mouse, a game controller, and/or a touchscreen, etc. At step 220, the computer game 150 moves visual elements in a virtual environment of the computer game, based on the received input. The visual elements may include the avatar 154 and/or the virtual objects 155 with which the avatar 154 interacts.

Assume that the computer game plays back a soundtrack to accompany the virtual environment. At step 230, the computer game 150 alters playback of the soundtrack, based on movement of the virtual element in response to the user input. Altering playback of the soundtrack includes changing a property of the playback of the soundtrack. The property includes, without limitation, volume, tempo, key, scale, dynamics, and instrument type, chord type, etc. The step 230 is further described below in conjunction with FIG. 3. After altering playback of the soundtrack, the computer game 150 may optionally generate a visual effect based on the altered playback of the soundtrack (steps 240 and 250). Generating the visual effect is further described below in conjunction with FIGS. 5-7.

Figure 3:
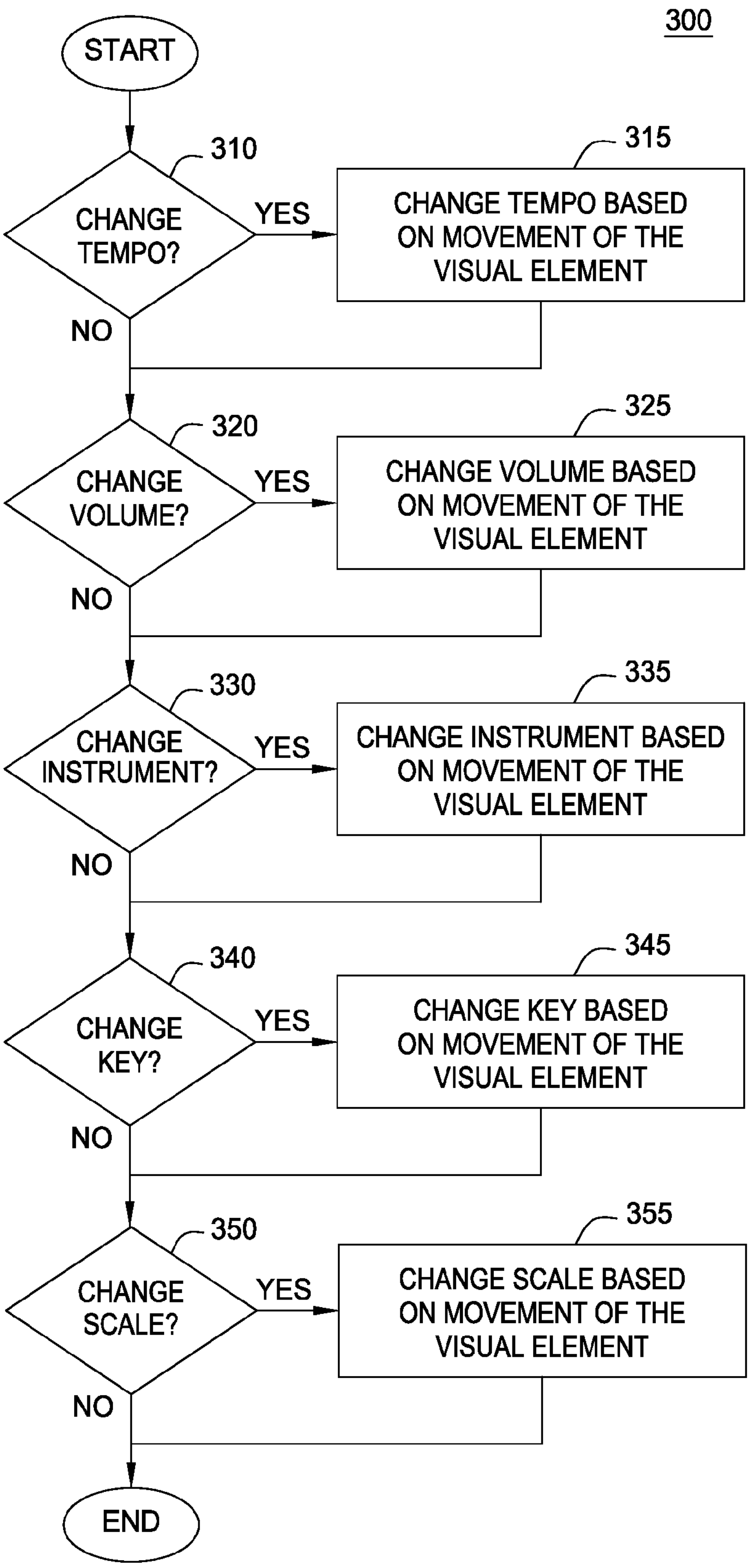
FIG. 3 is a flowchart depicting a method for altering playback of the soundtrack, according to one embodiment of the invention.
Figure 4A:
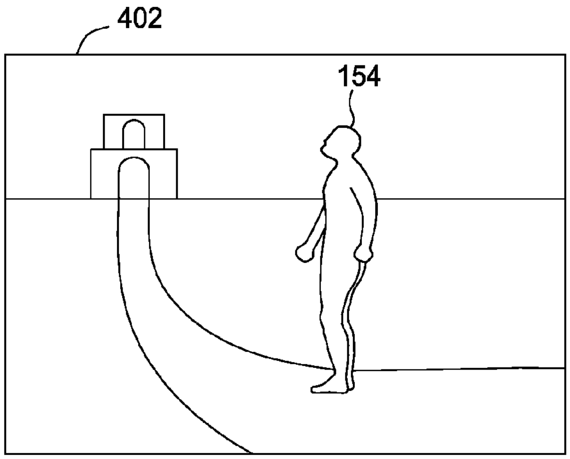
FIGS. 4A-4C illustrate exemplary GUI screens of the computer game, according to one embodiment of the invention.
Figure 4B:
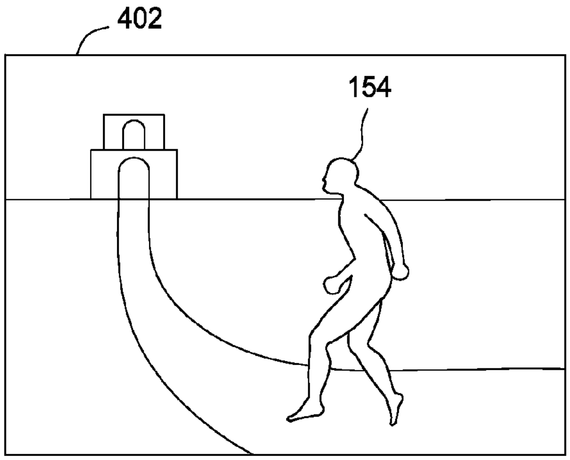
Figure 4C:
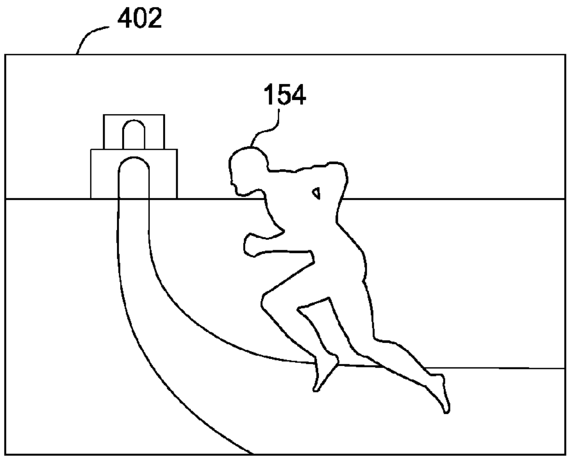

Referring now to FIG. 3, a method 300 is shown for altering playback of the soundtrack according to an embodiment of the invention. The method 300 corresponds to the step 230 of FIG. 2 and is further described with reference to FIGS. 4A-C, which illustrate exemplary GUI screens 402 of the computer game 150. Specifically, the figures show a series of state transitions for an avatar 154 that is initially in a standing animation (FIG. 4A), then a walking animation (FIG. 4B) and finally a running animation (FIG. 4C). For instance, to specify that the avatar 154 should run rather than walk, the user may depress a "run" button on the game controller, use an analog stick on the game controller, tap twice on a directional pad of the game controller, etc. As shown, method 300 performs a plurality of checks for various alterations to the soundtrack responsive to the changes in the movement the avatar 154. The alterations may have been specified by a developer of the computer game 150 in the form of metadata (e.g., rules) enforced by an engine, where the metadata specify an association between the specific movement of the visual element and a corresponding adjustment to the soundtrack.

Thus, at step 310 the method determines whether the specific movement of the avatar is associated with a change to the tempo of soundtrack. If so, the computer game 150 changes the tempo of the soundtrack playback based on the movement of the avatar (step 315). The change in tempo is illustrated in FIGS. 4A-C, where the avatar is initially standing still (FIG. 4A) and a soundtrack is played at a default tempo (illustrated in FIG. 4A as "Normal"). In response to user input controlling the avatar 154, the avatar 154 transitions into a walking animation (FIG. 4B) in which the computer game 150 plays the soundtrack at a relatively faster tempo (illustrated in FIG. 4B as "T1×Normal tempo").

T1 represents a first tempo multiplier than can be applied to a "Normal" track tempo, where T1 equals any value (integer or fraction) greater than one. During the running animation of the avatar 154 (FIG. 4C), the computer game 150 plays the soundtrack at an even faster tempo than during the walking or standing animations of the avatar 154. The running tempo is illustrated in FIG. 4C as "T2×Normal tempo", where T2 represents a second tempo multiplier greater than T1. In this example, each distinct animation sequence of the avatar 154 corresponds to a distinct tempo of playback of the soundtrack accompanying the scene. The correspondences between animation sequences and soundtrack playback may be specified by the developer of the computer game 150. Alternatively, the tempo adjustments may be user configurable through an appropriate user interface of the game.

Referring again to FIG. 3, if the specific movement of the avatar has been associated with a change to the volume of soundtrack playback (step 320), then the computer game 150 changes the volume based on the movement of the avatar (step 325). Thus, in a standing animation (FIG. 4A) the soundtrack is played with a first volume level of percussion. Responsive to input from the user, the avatar begins walking (FIG. 4B) and the computer game 150 plays the soundtrack with second volume level of percussion, i.e., heavier percussion than at the first level during the standing animation of the avatar 154 (FIG. 4A). Further, during the running animation of the avatar 154 (FIG. 4C), the computer game 150 plays the soundtrack with a third volume level of percussion, which is even heavier percussion than the second level during the walking animation of the avatar 154. As with the tempo, the various levels of percussion may be determined as some multiplier of a base level.

If the specific movement of the avatar has been associated with a change to the instrument of soundtrack playback based on the movement of the avatar (step 330), then the computer game 150 changes the instrument of soundtrack playback based on the movement of the avatar (step 335). To facilitate understanding of the step 335, FIGS. 4A-4C also illustrate an example in which the lead instrument is selected based on the movement of the avatar. As shown in FIG. 4A, when the avatar 154 is in a standing animation, the computer game 150 plays the soundtrack with a keyboard as the lead instrument. During the walking animation of the avatar 154 (FIG. 4B), the computer game 150 plays the soundtrack with an acoustic guitar as the lead instrument, rather than the keyboard. During the running animation of the avatar 154 (FIG. 4C), the computer game 150 plays the soundtrack with an electric guitar as the lead instrument, rather than the keyboard or the acoustic guitar. In this example, each distinct animation sequence of the avatar 154 corresponds to a distinct lead instrument in the soundtrack accompanying the scene.

Referring again to FIG. 3, if the specific movement of the avatar has been associated with a change to the key of soundtrack playback based on the movement of the avatar (step 340), the computer game 150 changes the key of soundtrack playback based on the movement of the avatar (step 345). Changing the key of soundtrack playback based on the movement of the avatar is further described below in conjunction with FIGS. 5A-5C. Further, if the specific movement of the avatar has been associated with a change to the (musical) scale of soundtrack playback based on the movement of the avatar (step 350), the computer game 150 changes the scale of soundtrack playback (step 355). For example, the computer game 150 may change a major scale of the soundtrack playback to a minor scale, during the running animation of the avatar 154. After the step 355, the method 300 terminates.

Those skilled in the art will recognize that FIG. 3 and FIGS. 4A-4C are merely illustrative and other embodiments are possible. In particular, it is contemplated that the property being altered may be associated with an individual instrument or with a plurality of instruments. For example, rather than altering the volume of the soundtrack overall, the computer game 150 may alter the volume of an individual instrument in the soundtrack (e.g., the lead instrument in the soundtrack). Further, the adjustments (e.g., the tempo multipliers) may be integer values (e.g., 1, 2, 3, etc.) or real values (1, 2.1, 3.2, 4.3, etc.). And the transition of the soundtrack between playback configurations may be abrupt or smooth to achieve a desired effect. Further, other alterations of playback are broadly contemplated, such as stopping playback of a soundtrack, removing an instrument from a soundtrack, and playing a different soundtrack altogether, in response to a specified animation sequence of the avatar or other virtual object.

Depending on the embodiment, the computer game 150 may also synchronize the playback of the soundtrack with the animation sequence itself. For example, during the walking and running animation of the avatar 154 (FIGS. 4B and 4C), the computer game 150 plays the soundtrack such that beats of the percussion are choreographed with the footsteps of the avatar 154 in the animation. In one embodiment, choreographing refers to directing the animation of a visual element of the virtual world and/or playback of the musical score, such that the animation and the playback are in sync with one another (e.g., to achieve an desirable aesthetic effect).

In one embodiment, the computer game 150 may choreograph an animation with playback of a soundtrack as follows. The computer game 150 retrieves choreography data, which may refer to data that is used to choreograph the animation with the playback. The choreography data may include metadata associated with the animation and/or soundtrack. For example, the metadata for the soundtrack specifies a loop duration of the soundtrack, a tempo of the soundtrack, a count of instruments in the soundtrack, etc. The metadata for the animation specifies a loop duration of the animation, keyframes of the animation, a count of total frames in the animation, etc. The loop duration defines a period of time that elapses before the animation or soundtrack is repeated. The keyframes specify starting and ending frames of an animation sequence. The court represents the total number of instruments in the soundtrack. The metadata may be generated by a respective application for editing the animation and/or soundtrack or by a standalone utility that analyzes files associated with the animation/soundtrack according to a predefined file format. At least some of the metadata (such as keyframes) may be specified by a developer of the computer game 150. Based on the metadata (e.g., the loop durations), the computer game 150 may synchronize the animation with the soundtrack by truncating, speeding up, or slowing down playback of the animation and/or of the soundtrack. Accordingly, animations and soundtracks in the computer game may be synchronized more efficiently.

Those skilled in the art will also recognize that the techniques disclosed herein may be adapted for use in synchronizing any virtual object with which the avatar interacts—rather than the avatar itself—with the playback of the soundtrack. For example, assume that the avatar is playing soccer in the virtual environment of the computer game 150. The computer game 150 may adjust the playback key of the soundtrack based on a travelling speed of a soccer ball kicked by the avatar. The computer game 150 may also introduce dynamics (e.g., a staccato effect) to notes in the melody line of the soundtrack, such that the dynamics are synchronized with bouncing of the soccer ball.

As described above, in one embodiment, the computer game 150 also generates a visual effect in the virtual environment to accompany an altered playback of a soundtrack. The visual effect may be an environmental effect such as rainfall, snowfall, fireworks, particle effects, shooting stars, etc. By generating the visual effect in the virtual environment, the computer game 150 may provide to the user a more immersive experience that is centered on the altered playback of the soundtrack.

Accordingly, referring again to FIG. 2, after altering playback of the soundtrack (step 230), the computer game 150 determines whether to generate a visual effect based on the altered playback of the soundtrack (step 240). This determination may be made based on a flag that specifies whether to the visual effect should depend on the altered playback of the soundtrack. The flag may be specified by a developer or user of the computer game. If an affirmative determination is made at the step 240, then the computer game 150 may generate a visual effect in the scene, based on the altered playback of the soundtrack (step 250). After the step 250, or if a negative determination is made at the step 240, the method 200 terminates.

Generating the visual effect based on the altered playback of the soundtrack (step 250) is now described with reference to the examples illustrated in FIGS. 5A-7B. Referring now to FIGS. 5A-5C, during the standing animation of the avatar 154 (FIG. 5A), the computer game 150 plays the soundtrack normally and generates fireworks 502 as an environmental effect in the scene. During the walking animation of the avatar 154 (FIG. 5B), the computer game 150 transposes the soundtrack upwards by one semitone and increases the size of the fireworks (e.g., a diameter of the exploding pattern of the fireworks). During the running animation of the avatar 154 (FIG. 5C), the computer game 150 transposes the soundtrack upwards by an additional semitone and further increases the size of the fireworks. Further, the fireworks may also be synchronized with the soundtrack and/or the animations of the avatar 154. For example, each firework explosion may occur during a down beat of the soundtrack or during a stepping motion of an avatar in a running animation. Of course, other properties of the environmental effect may be modified, such as frequency of fireworks, duration of each firework, color of firework, pattern of firework, etc. Advantageously, by generating the fireworks based on the altered playback of the soundtrack, the computer game 150 provides a virtual environment where user actions affect both the soundtrack playback and environment effects in the virtual environment, thereby providing a more compelling experience to the user.

Figure 6A:
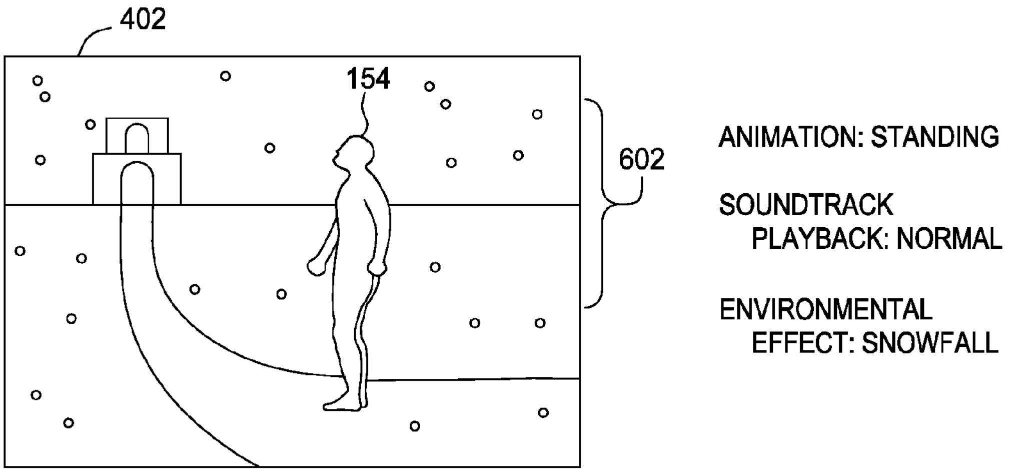
FIGS. 6A-6C illustrate additional exemplary GUI screens of the computer game, according to one embodiment of the invention.
Figure 6B:
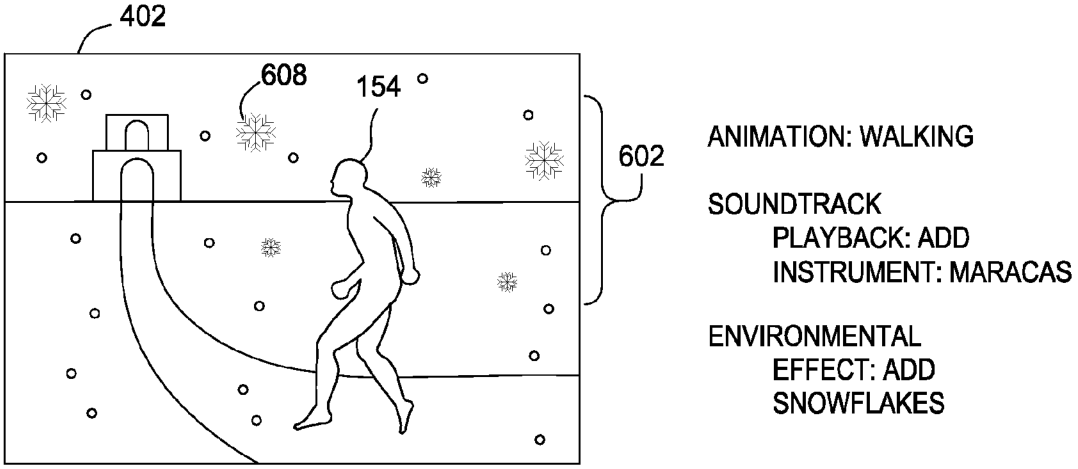
Figure 6C:
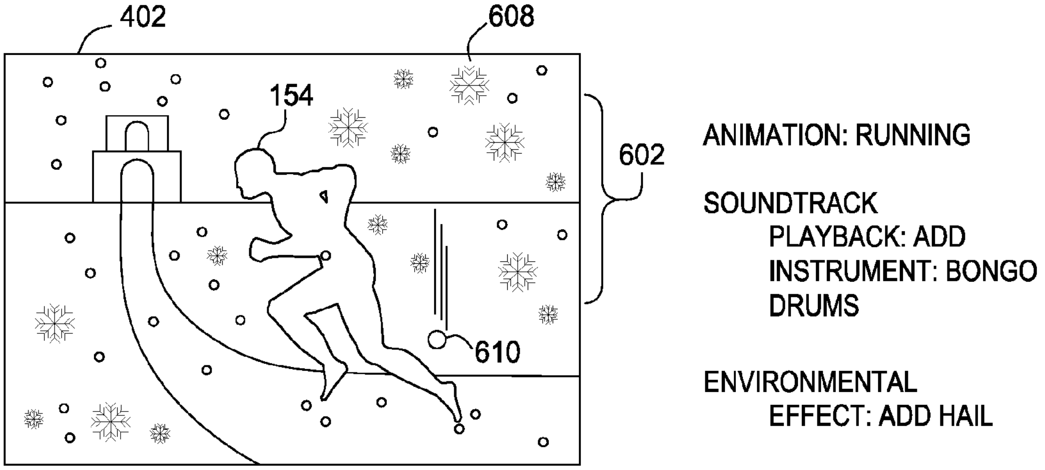

FIGS. 6A-6C illustrate another example of generating the visual effect based on the altered playback of the soundtrack (step 250), according to one embodiment of the invention. As shown in FIG. 6A, during the standing animation of the avatar 154, the computer game 150 plays the soundtrack normally and generates precipitation as an environmental effect in the scene, where the precipitation includes snowfall 602. During the walking animation of the avatar 154 (FIG. 6B), the computer game 150 adds an instrument (maracas) to the playback of the soundtrack and modifies the precipitation to include visually distinctive snowflakes (e.g., snowflake 608), in addition to the snowfall 602. During the running animation of the avatar 154 (FIG. 6C), the computer game 150 adds an additional instrument (bongo drums) to the playback of the soundtrack and further modifies the precipitation to include hail (e.g., hail 610), in addition to the snowfall 602. Further, the precipitation may also be synchronized with the soundtrack and/or the animations of the avatar 154. Of course, those skilled in the art will recognize that other properties of the environmental effect may be modified, such as speed, size, and/or color of falling snow, snowflake patterns, etc.

Figure 7A:
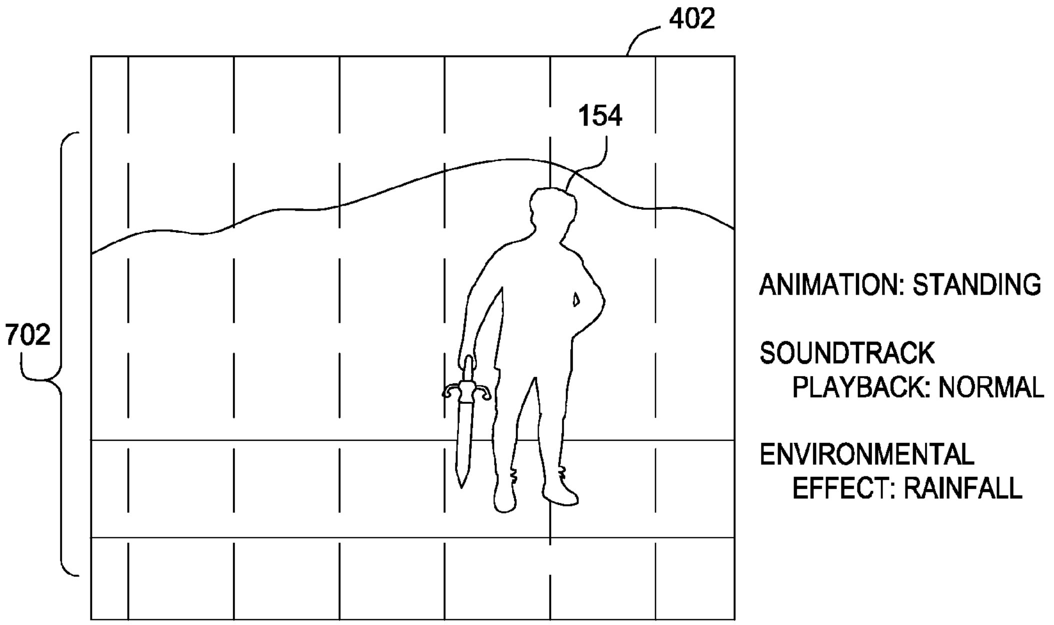
FIGS. 7A-7B illustrate additional exemplary GUI screens of the computer game, according to one embodiment of the invention.
Figure 7B:
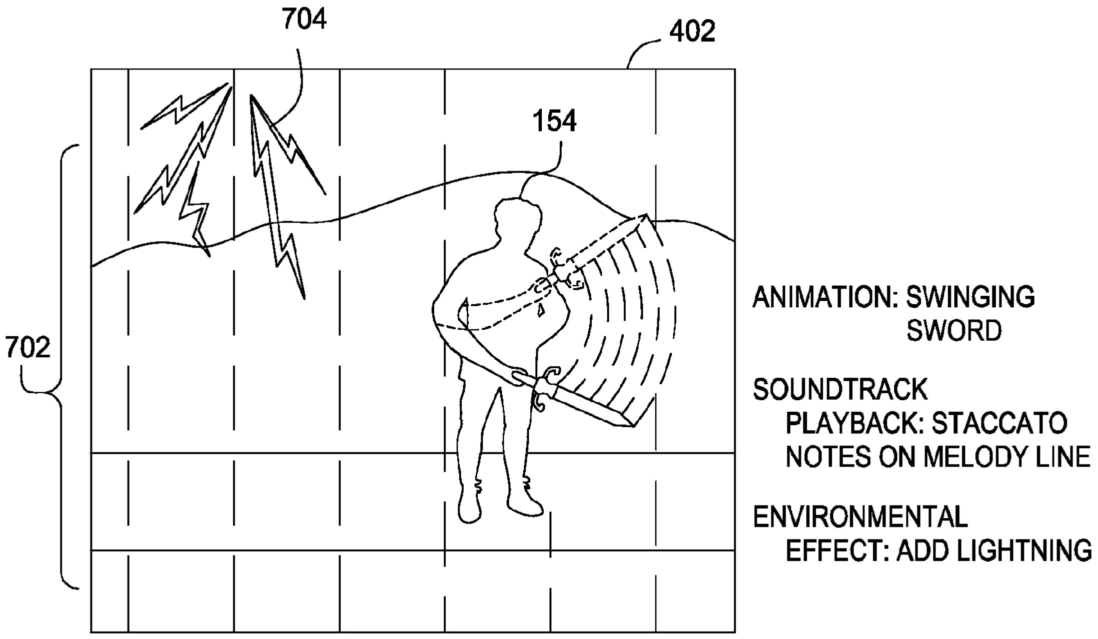

FIGS. 7A-7B illustrate yet another example of generating the visual effect based on the altered playback of the soundtrack (step 250), according to one embodiment of the invention. As shown in FIG. 7A, during the standing animation of the avatar 154, the computer game 150 plays the soundtrack normally and generates rainfall 702 as an environmental effect in the scene. During a sword-swinging animation of the avatar 154 (FIG. 7B), the computer game 150 modifies playback of the melody line of the soundtrack to include dynamics (e.g., staccato or legato effects of notes in the melody line) and modifies the rainfall 702 to include lightning strikes (e.g., lightning strike 704). Further, the lightning strike may be synchronized with the soundtrack and/or the animations of the avatar 154. For example, each lightning strike may occur during a staccato note of the melody line of the soundtrack or during a swing of the sword by the avatar 154. Of course, those skilled in the art will recognize that other properties of the environmental effect may be modified, such as speed and/or density of rainfall, size of raindrops, color and pattern of lightning strikes, etc.

Figure 8:
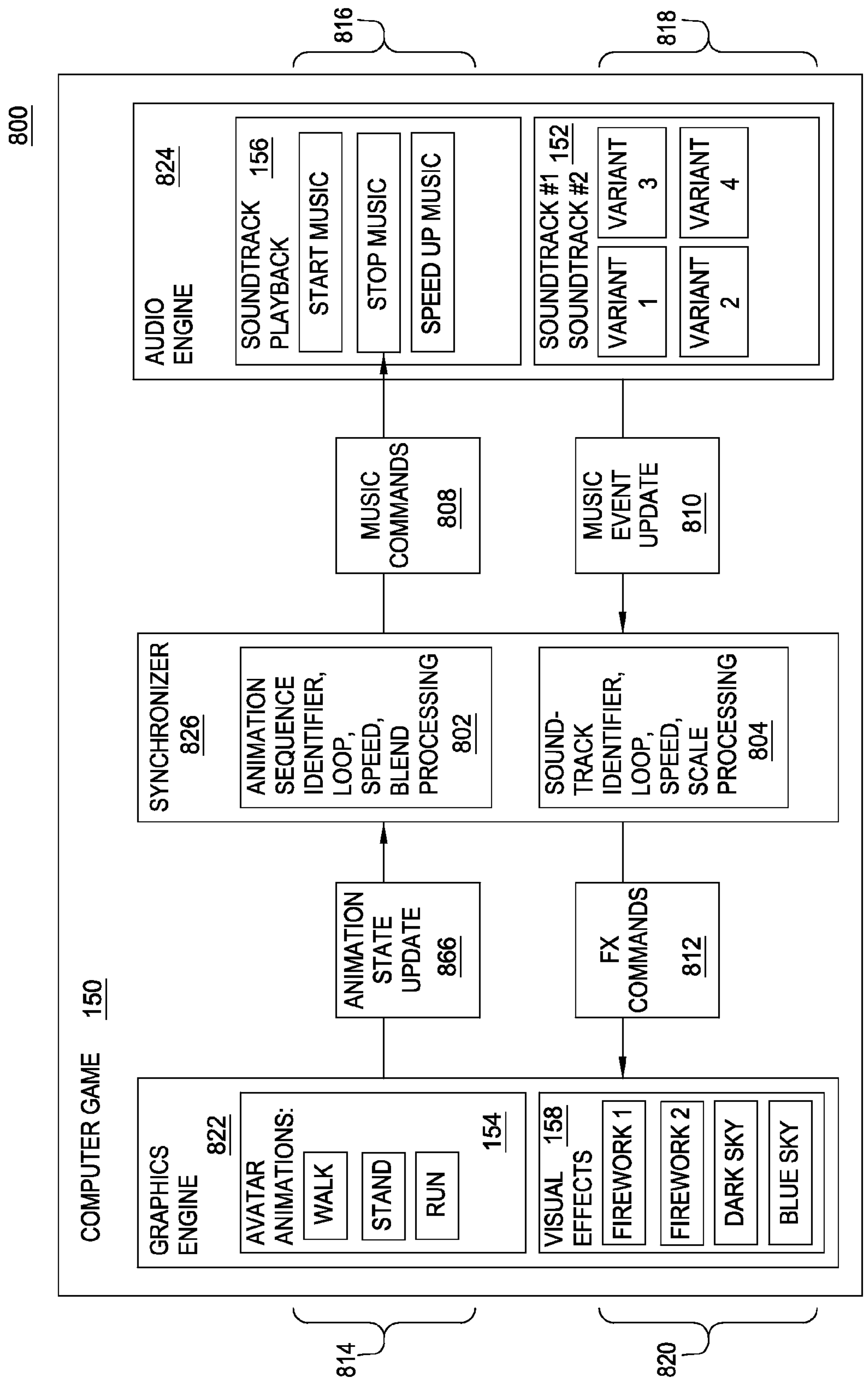
FIG. 8 illustrates components of the computer game, according to one embodiment of the invention.

Referring now to FIG. 8, components 800 of the computer game 150 of FIG. 1 are shown, according to one embodiment of the invention. The components 800 of the computer game 150 include a graphics engine 822, an audio engine 824, and a synchronizer 826. The graphics engine 822 is responsible for the rendering aspects of the computer game 150 and includes the avatar 154 and the visual effects 158. The audio engine 824 is responsible for the audio output of the computer game 150 and includes the soundtrack playback 156 and the soundtracks 152. The synchronizer 822 is responsible for coordinating the graphical output of the graphics engine 822 and the audio output of the audio engine 824 to provide a more compelling user experience of the computer game 150.

As shown, the avatar 154 includes animation sequences 814. The animation sequences may include a walking animation sequence, a standing animation sequence, a running animation sequence, etc. Each soundtrack 152 may include distinct variants 818 of the respective soundtrack 152. For example, each variant of a soundtrack may differ by key, scale, instrument, etc. The soundtrack playback 156 includes properties 816. The properties 816, when modified, allow playback to be started, stopped, sped up, etc. The visual effects 158 include environmental effects 820 such as fireworks, a dark sky, a blue sky, etc.

In one embodiment, the synchronizer 826 determines the soundtrack being played for the virtual environment of the computer game 150. For example, the synchronizer 826 may receive a message 810 from the audio engine 824 of the computer game. Further, the synchronizer 826 determines that the avatar is entering a different animation sequence. For example, the synchronizer 826 may receive a message 806 from a graphics engine 822 of the computer game 150, indicating that the avatar is entering a different animation sequence.

In one embodiment, in response to the avatar entering the different animation sequence, the computer game 150 alters playback of the soundtrack in the virtual environment. For example, the synchronizer 826 may send commands to the audio engine, specifying to start, stop, or modify a property of playback of the soundtrack. The synchronizer 826 may also coordinate playback of the soundtrack to synchronize the playback with the animation of the avatar 154. The coordination may be performed based on metadata 802 associated with animation sequences of the avatar 154 and metadata 804 associated with soundtracks 152. For example, the metadata 802 includes an animation sequence identifier, an animation loop duration, an animation speed, and data for animation blend processing, while the metadata 804 includes a soundtrack identifier, a soundtrack loop duration, a soundtrack speed, and data for performing scale processing, etc. Scale processing refers to modifying a playback scale of a soundtrack. Animation blend processing refers to providing a smooth transition between different animation sequences, by designating specific frames in each animation sequence as transition points, to minimize disparity of the avatar (or virtual object) across the designated frames. The computer game 150 may blend transitions in soundtrack playback and transitions in animations (of the avatar 154 and/or of the visual effects 158) to provide smoother transitions. For example, rather than abruptly changing the lead instrument of a soundtrack from keyboard to acoustic guitar, the computer game 150 may gradually decrease the volume of the keyboard while gradually increasing the volume of the acoustic guitar.

Further, the computer game 150 may generate the visual effects 158 based on the altered playback of the soundtrack. For example, the synchronizer 826 may send commands 812 to the graphics engine 822, specifying to generate visual effects based on the altered playback of the soundtrack. The commands 812 specify properties of the visual effects to be generated. As such, the synchronizer 826 coordinates the generation of the visual effects such that the visual effects are synchronized with the soundtrack playback and/or the animations of the avatar 154. The coordination is performed based on metadata 802 associated with animation sequences of the environmental effects and metadata 804 associated with soundtracks 152.

Figure 9A:
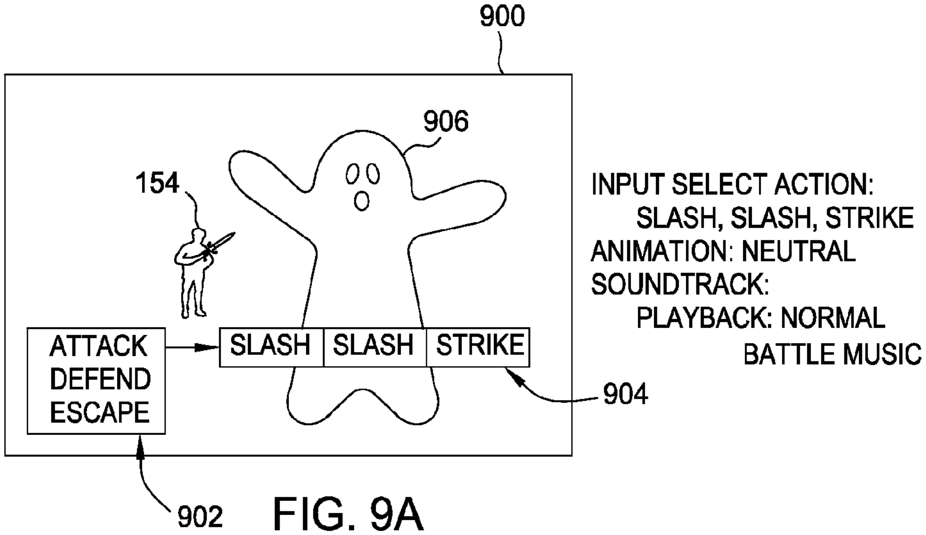
FIGS. 9A-9C illustrate an example of synchronizing grouped animation sequences with grouped alterations of soundtrack playback, according to one embodiment of the invention.
Figure 9B:
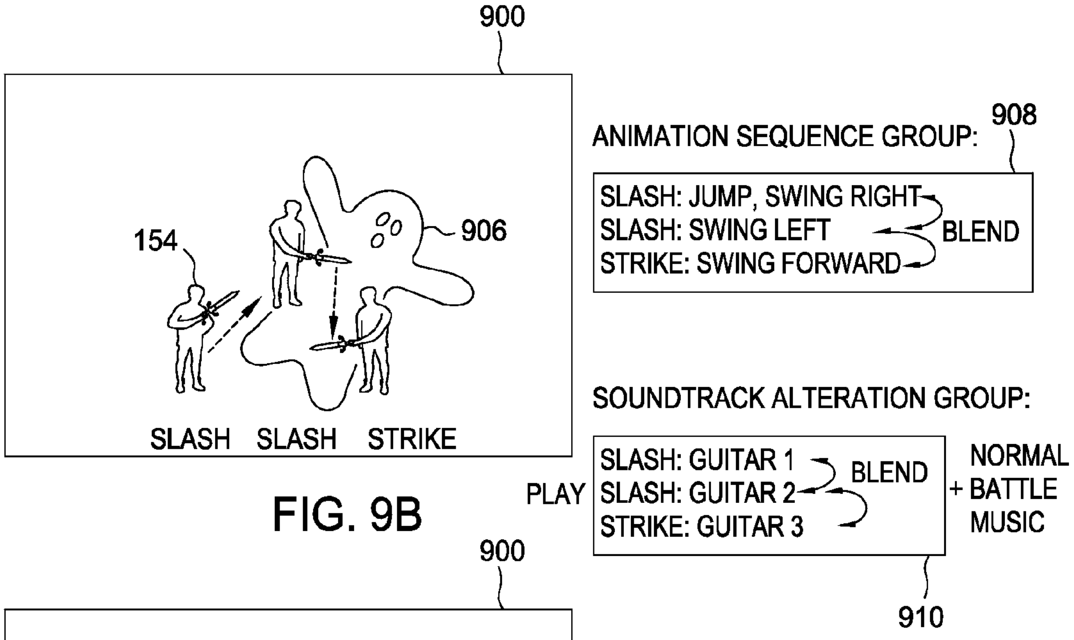
Figure 9C:
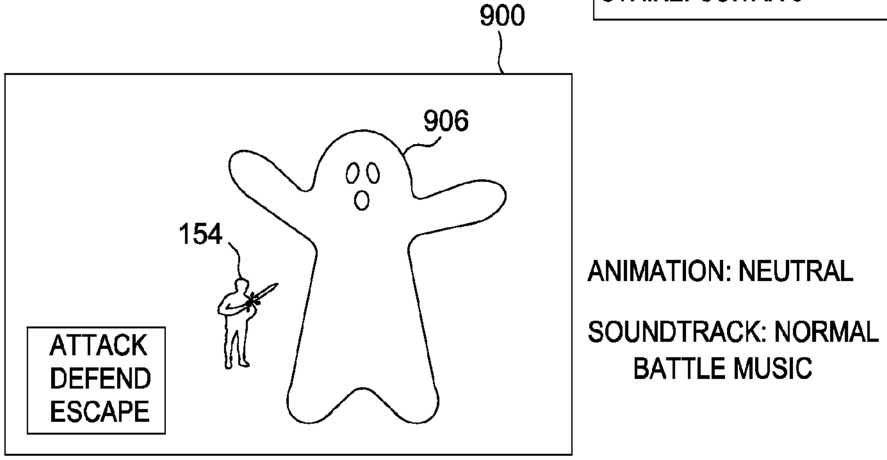

FIGS. 9A-9C illustrate an example of synchronizing grouped animation sequences with grouped alterations of soundtrack playback, according to one embodiment of the invention. As shown in FIG. 9A, an exemplary GUI screen 900 of a turn-based role-playing game depicts a battle occurring between the avatar 154 and an enemy 906. The GUI screen 900 also includes a menu 902 from which a user playing the computer game 150 may input commands for the avatar 154. For example, the user may command the avatar 154 to attack the enemy 906, to defend itself, or to escape from the enemy 906, etc. The user may also specify how the command is carried out. For instance, the user may command the avatar 154 to perform the following attacks 904 against the enemy 906: a first sword slash, a second sword slash, and a sword strike.

As shown in FIG. 9B, in response to the input from the user, the computer game 150 outputs a group 908 of animation sequences of the avatar 154. The group 908 of animation sequences includes one or more animation sequences for each of the attacks specified by the user. For example, for the first sword slash, the computer game 150 may output a jumping animation sequence followed by an animation sequence involving swinging the sword to the right. For the second sword slash, the computer game 150 may output an animation sequence involving swinging the sword to the left. For the sword strike, the computer game 150 may output an animation sequence involving thrusting the sword forward. The computer game 150 may also apply blend processing to the animation sequences to provide a smoother transition between the animation sequences. The correspondences between the animation sequences of the avatar 154 and the actions of the avatar 154 (i.e., attacks in this example) may be specified by a developer of the computer game 150.

In one embodiment, the computer game 150 also outputs a group 910 of alterations of soundtrack playback accompanying the battle between the avatar 154 and the enemy 906. To this end, as the computer game 150 outputs animation sequences for each action of the avatar 154, the computer game 150 may correspondingly alter playback of the soundtrack (e.g., as specified by the developer). For example, during the first sword slash of the avatar 154, the computer game 150 may introduce a new instrument to the soundtrack, such as a first type of guitar (e.g., acoustic guitar). During the second sword slash of the avatar 154, the computer game 150 may replace the new instrument with a different instrument, e.g., a second type of guitar (e.g., electric guitar). During the sword strike of the avatar 154, the computer game 150 may replace the new instrument with yet another instrument, e.g., a third type of guitar (e.g., bass guitar). The computer game 150 may also apply blend processing to the soundtrack playback alterations to provide a smoother transition between the alterations (e.g., by simultaneously fading out the acoustic guitar and fading in the electric guitar). Accordingly, as the avatar 152 performs a group of actions specified by the user, the computer game 150 outputs a corresponding group of animation sequences that is synchronized with a group of soundtrack playback alterations. For example, durations of animation sequences in the former group may match durations of altered soundtrack playback in the latter group. As shown in FIG. 9C, after the avatar 152 completes the group of actions, animation of the avatar returns to a neutral state and playback of the soundtrack also returns to a normal state.

Advantageously, embodiments of the invention provide a framework for associating visual elements of a computer game with soundtracks of the computer game. A developer of the computer game may specify relationships between animation sequences and soundtracks. The developer may also specify relationships between animation sequences and playback properties of the soundtracks. Based on the specified relationships, the computer game 150 coordinates animations of the avatar (or of the virtual objects) and playback of the soundtracks to provide a more compelling user experience. For example, the computer game 150 may synchronize soundtrack playback with the animations of the avatar. The computer game 150 may also generate environmental effects that are synchronized with the soundtrack playback. In doing so, the developer may also avoid manually synchronizing animations in the computer game with soundtracks of the computer game. Further, each user playing the computer game may have a distinct gaming experience that is customized based on the actions of the respective user. By using the framework to associate visual elements of the computer game with soundtracks of the computer game, productivity in developing the computer game may be improved and user satisfaction with the computer game may be increased.

While the foregoing is directed to embodiments of the present invention, other and further embodiments of the invention may be devised without departing from the basic scope thereof, and the scope thereof is determined by the claims that follow.

What is claimed is:

1. A computer-implemented method to provide immersion in a virtual environment of a computer game, based on user input and choreography data, the method comprising:

playing back a musical score accompanying the virtual environment of the computer game;

receiving the user input to the computer game;

moving a visual element in the virtual environment of the computer game, in response to the received user input;

by operation of one or more computer processors, altering playback of the musical score accompanying the virtual environment, based on the movement of the visual element and according to the choreography data, wherein the choreography data associates the movement of the visual element with the playback of the musical score, wherein the altering is not pre-scripted; and generating, in the virtual environment, an environmental effect that is choreographed to the altered playback of the musical score, to provide immersion in the virtual environment, wherein the environmental effect is different from the visual element.

2. The computer-implemented method of claim 1, wherein altering playback of a musical score accompanying the virtual environment comprises changing a property comprising at least one of a playback volume, a playback tempo, a playback key, and a playback scale, and a playback dynamic.

3. The computer-implemented method of claim 2, wherein the property pertains to at least one of the musical score and an instrument in the musical score.

4. The computer-implemented method of claim 1, wherein altering playback of the musical score accompanying the virtual environment comprises stopping playback of the musical score, and wherein the method further comprises:

playing back another musical score based on movement of the visual element in response to the user input.

5. The computer-implemented method of claim 1, wherein the visual element being moved in the virtual environment comprises at least one of a player avatar and a virtual object.

6. The computer-implemented method of claim 1, wherein the movement of the visual element in the virtual environment does not otherwise have any affect on the environmental effect, wherein the choreography data is predefined, wherein the method is performed by a virtual world application, wherein the virtual world application comprises a graphics engine component, an audio engine component, and a synchronizer component.

7. The computer-implemented method of claim 6, wherein the audio engine component is configured to alter playback of the musical score by changing each property selected from a playback volume, a playback tempo, a playback key, and a playback scale, a playback dynamic, a playback variant of the musical score, and a count of audible musical instruments in the musical score, wherein the property pertains to at least one of the musical score and an instrument in the musical score.

8. The computer-implemented method of claim 7, wherein the visual element being moved in the virtual environment comprises at least one of a player avatar and a virtual object, wherein the audio engine component is further configured to alter playback of the musical score by:

stopping playback of the musical score; and playing back another musical score based on movement of the visual element in response to the user input.

9. The computer-implemented method of claim 8, wherein the graphics engine component is configured to generate each choreographed environmental effect selected from a firework pattern having a diameter that is based on the playback of the musical score, a snowfall pattern having a type that is based on the playback of the musical score, a rainfall pattern having a type that is based on the playback of the musical score, a particle effects pattern having a type that is based on the playback of the musical score, and a shooting star pattern having a type that is based on the playback of the musical score.

10. The computer-implemented method of claim 9, wherein the synchronizer component is configured to synchronize: (i) an animation sequence associated with the movement of the visual element and (ii) the playback of the musical score; wherein the animation sequence includes an animation sequence identifier, a loop flag, a speed designation, and a blend processing flag; wherein the musical score includes a soundtrack identifier, a loop flag, a speed designation, and a scale processing flag;

wherein the synchronizer component is further configured to receive animation state update messages from the graphics engine component and send environmental effect commands to the graphics engine component, wherein the synchronizer component is further configured to receive music event update messages from the audio engine component and send music commands to the audio engine component.

11. The computer-implemented method of claim 10, wherein the audio engine component is configured to:

setting a first count of audible musical instruments in the musical score, based on a first type of movement of the visual element;

setting a second count of audible musical instruments in the musical score, based on a second type of movement of the visual element;

setting a third count of audible musical instruments in the musical score, based on a third type of movement of the visual element;

wherein each count of audible musical instruments is distinct, wherein each type of movement of the visual element is distinct, wherein the audio engine is further configured to perform blend processing to smooth transition between different counts of audible instruments.

12. A non-transitory computer-readable medium containing a program which, when executed, performs an operation to provide immersion in a virtual environment of a computer game, based on user input and choreography data, the operation comprising:

playing back a musical score accompanying the virtual environment of the computer game;

receiving the user input to the computer game;

moving a visual element in the virtual environment of the computer game, in response to the received user input;

by operation of one or more computer processors, altering playback of the musical score accompanying the virtual environment, based on the movement of the visual element and according to the choreography data, wherein the choreography data associates the movement of the visual element with the playback of the musical score, wherein the altering is not pre-scripted: and generating, in the virtual environment, an environmental effect that is choreographed to the altered playback of the musical score, to provide immersion in the virtual environment, wherein the environmental effect is different from the visual element.

13. The non-transitory computer-readable medium of claim 12, wherein altering playback of a musical score accompanying the virtual environment comprises changing a property comprising at least one of a playback volume, a playback tempo, a playback key, and a playback scale, and a playback dynamic.

14. The non-transitory computer-readable medium of claim 13, wherein the property pertains to at least one of the musical score and an instrument in the musical score.

15. The non-transitory computer-readable medium of claim 12, wherein altering playback of the musical score accompanying the virtual environment comprises stopping playback of the musical score, and wherein the method further comprises:

playing back another musical score based on movement of the visual element in response to the user input.

16. The non-transitory computer-readable medium of claim 12, wherein the visual element being moved in the virtual environment comprises at least one of a player avatar and a virtual object.

17. A system to provide immersion in a virtual environment of a computer game, based on user input and choreography data, the system comprising:

one or more computer processors; and a memory containing a program, which when executed by the one or more computer processors is configured to perform an operation comprising:

playing back a musical score accompanying the virtual environment of the computer game;

receiving the user input to the computer game;

moving a visual element in the virtual environment of the computer game, in response to the received user input;

altering playback of the musical score accompanying the virtual environment, based on the movement of the visual element and according to the choreography data, wherein the choreography data associates the movement of the visual element with the playback of the musical score, wherein the altering is not pre-scripted; and generating, in the virtual environment, an environmental effect that is choreographed to the altered playback of the musical score, to provide immersion in the virtual environment, wherein the environmental effect is different from the visual element.

18. The system of claim 17, wherein altering playback of a musical score accompanying the virtual environment comprises changing a property comprising at least one of a playback volume, a playback tempo, a playback key, and a playback scale, and a playback dynamic.

19. The system of claim 18, wherein the property pertains to at least one of the musical score and an instrument in the musical score.

20. The system of claim 17, wherein altering playback of the musical score accompanying the virtual environment comprises stopping playback of the musical score, and wherein the method further comprises:

playing back another musical score based on movement of the visual element in response to the user input.

21. The system of claim 17, wherein the visual element being moved in the virtual environment comprises at least one of a player avatar and a virtual object.

* * * * *

UNITED STATES PATENT AND TRADEMARK OFFICE

CERTIFICATE OF CORRECTION

PATENT NO. : 8,382,589 B2
APPLICATION NO. : 12/883863
DATED : February 26, 2013
INVENTOR(S) : Koo It is certified that error appears in the above-identified patent and that said Letters Patent is hereby corrected as shown below:

In the Claims:

Column 14, Claim 6, Line 3, please delete “have any”;

Column 14, Claim 6, Line 3, please delete “on”;

Column 15, Claim 12, Line 19, please delete “:” and insert -- ; -- therefor.

Signed and Sealed this
Twenty-eighth Day of May, 2013

Teresa Stanek Rea
*Acting Director of the United States Patent and Trademark Office*